United States Patent [19]

Matsuda et al.

[11] Patent Number: 5,316,834
[45] Date of Patent: May 31, 1994

[54] FIBER-REINFORCED THERMOPLASTIC SHEET

[75] Inventors: Tsutomu Matsuda; Yoh Goto, both of Iwakuni; Tatsuya Shibata, Shiki, all of Japan

[73] Assignee: Teijin Limited, Osaka, Japan

[21] Appl. No.: 872,302

[22] Filed: Apr. 23, 1992

[30] Foreign Application Priority Data

Apr. 23, 1991 [JP] Japan .................................. 3-117880
May 14, 1991 [JP] Japan .................................. 3-136990

[51] Int. Cl.$^5$ .............................................. B32B 5/02
[52] U.S. Cl. ..................... 428/233; 428/246; 428/248; 428/253; 428/254; 428/284; 428/287; 428/296; 428/300; 428/408; 428/902; 428/920; 428/921
[58] Field of Search ............. 428/245, 294, 408, 902, 428/246, 248, 253, 254, 284, 287, 296, 297, 298, 920, 921, 300, 233

[56] References Cited

U.S. PATENT DOCUMENTS 3,778,334 12/1973 Sturgeon ............................. 161/156
4,992,127 2/1991 Hishi et al. .......................... 156/182

FOREIGN PATENT DOCUMENTS 0122024 10/1984 European Pat. Off. .

OTHER PUBLICATIONS

Database WPIL Week 3582, Derwent Publications Ltd., London, GB, AN 82-73611E & JP-B-60 050 146 (Toray Ind Inc) 7 Nov. 1985.

*Primary Examiner*—James J. Bell
*Attorney, Agent, or Firm*—Sherman and Shalloway

[57] ABSTRACT

A fiber-reinforced thermoplastic sheet such as a flame-resistant, fiber-reinforced thermoplastic sheet comprising at least one first layer formed by impregnating a woven or knitted fabric of continuous carbon fibers with a matrix resin of a thermoplastic resin and at least one second layer formed by impregnating a fiber structure material of a heat-resistant fiber with a matrix resin of a thermoplastic resin, the above first layer(s) and the second layer(s) being laminated integrally, the second layer having the heat-resistant fibers substantially uniformly distributed in the matrix resin in the cross section of the sheet and substantially having no voids of which the diameter exceeds the fiber diameter of the heat-resistant fibers, the fiber structure material, used in the second layer, having a fiber-entangling strength of at least 1.0 kg/mm$^2$ in any directions crossing at right angles; and a process for the production thereof.

22 Claims, No Drawings

FIBER-REINFORCED THERMOPLASTIC SHEET

DETAILED DESCRIPTION OF THE INVENTION

The present invention relates to a fiber-reinforced thermoplastic sheet produced by composing a reinforcing fiber and a thermoplastic resin, and a process for the production thereof. In particular, it relates to a lightweight and thin fiber-reinforced thermoplastic sheet which is excellent in both mechanical properties (mechanical characteristics) and heat-moldability (formability), and a mass production process for the production thereof.

A thermoplastic sheet reinforced with a short fiber such as a glass or carbon fiber and a thermoplastic resin sheet reinforced with a mat of a continuous glass fiber or a continuous carbon fiber are commercially available as a so-called stampable sheet. There is also known a composite material comprising a thermoplastic resin sheet reinforced with a unidirectionally arranged continuous glass or carbon fiber.

Japanese Patent Publication (Kokoku) No. 15880/1976 describes a thermoplastic composite material reinforced with a glass fiber and a carbon fiber, produced by laminating thermoplastic resin layer(s) containing a glass fiber and carbon fiber layers, e.g., carbon fiber cloth, and pressing the laminate under heated condition.

Japanese Patent Publication (Kokoku) No. 50146/1985 proposes a stamp-moldable sheet comprising woven or knitted fabric(s) of a continuous carbon fiber and a nonwoven or unknitted fibrous reinforcing material, e.g., randomly arranged glass fiber mats. "Example 1" of this Publication discloses a sheet formed of four layers of carbon fiber woven fabrics ("TORAYCA" Cloth #6344, supplied by Toray Industries, Inc.), three layers of randomly arranged glass fiber mats (M8621, Weight (Metsuke): 300 g/m$^2$, supplied by Asahi Fiber Glass Company Ltd) and eight nylon 6 sheets having a thickness of 0.3 mm each.

The above Japanese Patent Publication describes to the following effect. The fibrous reinforcing material is incorporated to improve the flowability of the resin layer during the molding of the sheet. The above-described constitution makes it easy to fill the sheet in a stamping mold, and the sheet is improved in moldability. Therefore, the sheet can be molded into an article having a boss, a rib, etc., the molded article is improved in surface properties, and the reinforcing effect of the carbon fiber fabric is effectively exhibited.

However, as will be shown in Comparative Example which will follow, the above sheet has the following defect. When the above sheet is molded into an article in an open mold, i.e., a mold which is not tightly closed, a nonwoven or unknitted fibrous reinforcing material flows out to a great extent, which results in a decrease in the sheet thickness or an increase in the variability degree of the thickness, and at the same time, the irregular flowing (fiber disorder) of the carbon fiber fabric also undoubtedly increases.

In general, a sheet having a comparatively simple form such as a flat plate is usually produced in an open mold in view of workability. When such a sheet is produced from the sheet described in the above Publication, problems remain concerning thickness control (occurrence of variability in the thickness), yield of sheets (a decrease in the ratio of good products due to carbon fiber disorder) and machining of a flash. Farther, when a tray-shaped article is produced from the above sheet by stamp molding, it is essential to use a mold which can be nearly completely closed in order to prevent the nonwoven or unknitted fibrous reinforcing material from flowing out.

Among the above thermoplastic resin sheets, the reinforcing effectiveness of the sheet reinforced with a short glass fiber mat or a continuous glass fiber mat is low since the reinforcing fiber is a discontinuously reinforcing fiber and it has so bulky a structure that its content in the sheet is low. Therefore, the sheet has considerably low mechanical properties, and the use thereof is hence limited.

On the other hand, a thermoplastic resin sheet reinforced with a unidirectionally arranged glass fiber can give a sheet having excellent mechanical properties due to high reinforcing effectiveness of the reinforcing fiber. Since, however, the direction in the reinforcement is limited to a single direction, the sheet only shows mechanical properties of the resin in terms of the mechanical properties at right angles to the direction in the reinforcement. Thus, the resultant sheet extremely shows anisotropy. When quasi-isotropic properties are imparted to such a sheet, it is required to laminate 3 or 4 plies of unidirectionally reinforced thermoplastic resin sheets symmetrically at least with regard to the sheet plane and thickness. This requirement results in an unnecessary increase in the amount of a reinforcing fiber or causes a cost increase, and a huge amount of labor is required.

Meanwhile, as a method for improving the flammability (flame resistance) of a fiber-reinforced resin sheet which is required to have high mechanical properties or thermal properties, the following methods are known. (a) A method in which a polymer having a high limiting oxygen index (LOT) is used as a matrix resin which constitutes the fiber-reinforced resin sheet, (b) a method in which a flame retardant such as aluminum hydroxide, a halogen compound, antimony oxide or a phosphorous-containing compound is incorporated into a matrix resin, and (c) a method in which a limited amount of an inorganic fiber or filler is added to a matrix resin.

First, as a sheet according to the method (a) in which a resin having a high limiting oxygen index is used as a matrix resin which constitutes the fiber-reinforced resin sheet, there is known a polyphenylene sulfide sheet reinforced with a carbon fiber or a glass fiber. The matrix resin which constitutes the sheet is limited to specific resins. Therefore, this fiber-reinforced resin sheet has problems to solve concerning sheet performances other than the flamability and concerning a production cost and moldability. Further, generally usable matrix resins which constitute a fiber-reinforced resin sheet such as an unsaturated polyester resin, an epoxy resin, a nylon resin and a polycarbonate resin have a low limiting oxygen index.

Secondly, according to the method (b) in which a flame retardant is incorporated into a matrix resin to constitute the fiber-reinforced resin sheet, the flamability are improved, whereas the flame retardant extremely decreases the mechanical properties of the resin per se and the fiber-reinforced resin sheet formed of the matrix resin (particularly, breaking elongation and impact resistance of the sheet). Further, the electrical properties, the arc resistance and a CTI-tracking performance are extraordinarily decreased.

The above methods (a), (b) and (e) can be said to be effective to improve the flamability of a molded article formed of a resin alone or a fiber-reinforced resin sheet containing a reinforcing material in a comparatively small amount, although various problems other than the problem of flamability remain to solve.

However, in a fiber-reinforced resin sheet having a high content of a short fiber reinforcing material or a continuous fiber reinforcing material for the improvement of mechanical properties and thermal properties, i.e., having a so-called high $V_f$, it is difficult to improve its flamability by any of the above methods (b) and (c). The reason for this difficulty is considered as follows. The reinforcing fiber constituting the fiber-reinforced resin sheet inhibits the dripping behavior of the matrix resin constituting the sheet (the flame retardancy of plastic is generally remarkably improved by the dripping behavior of a melted or flaming resin), and further, it works to broaden the surface area of the flaming matrix resin which is in contact with air in atmosphere. The flamability of a fiber-reinforced resin sheet are determined by the flamability of the matrix resin constituting the sheet. Due to the above function of the reinforcing fiber, the flame resistance performance of the matrix constituting the fiber-reinforced resin sheet is deteriorated, and as a result, the flamability of the fiber-reinforced sheet is also deteriorated.

In the method (c) in which an inorganic fiber or filler is added, the flamability of a composite decrease by contraries when the content of the inorganic fiber or filler exceeds a certain limited amount. For example, a glass fiber-reinforced polycarbonate sheet is improved in the flamability until the glass fiber content in the glass fiber-reinforced polycarbonate sheet is up to a fiber volume fraction ($V_f$) of about 15%. however, when the glass fiber content exceeds the above volume fraction, the flamability of the glass fiber-reinforced sheet are rather decreased ("Plastics", Vol. 30, No. 4, page 51).

On the other hand, the main stream for the process of a thermoplastic resin molded article containing a continuous reinforcing fiber is a stamping molding method using a press machine. However, fiber-reinforced plastics are also produced by a vacuum molding method, an autoclave method or diaphragm molding method. For the continuous process, there are also known a filament winding method, a tape lay-up method using a tape material, a pultrusion method and a roll forming method are widely known as a method for processing a fiber-reinforced thermoplastics.

As described above, a stamping method using a press machine is widely used. In this method, however, cylindrical articles such as a cylinder cannot be produced. Therefore, a filament winding method, a tape lay-up method and a pultrusion method are selected from the above methods as a method for producing cylindrical articles such as a cylinder, and these methods are being put to practical use. Since, however, a thermoplastic resin has a high melting point and a high melt viscosity, these methods have difficulty concerning resin impregnatability. However, a variety of problems, e.g., a requirement of use of a special laser heating device in a tape lay-up method, remain to solve.

It is therefore no exaggeration to say that there is no universal method for producing cylindrical articles from a continuous fiber-reinforced thermoplastics.

A thermoplastic resin has a high melting point as compared with a thermosetting resin, and the melt-viscosity of a thermoplastic resin is several thousand times higher than that of a thermosetting resin. Therefore, the processing of a thermoplastic resin essentially requires high-temperature and high-pressure conditions, and the impregnation of a resin is difficult. Further, a processing apparatus leaving a large size is required, and a processing apparatus is eventually expensive.

In order to ease the impregnation of a thermoplastic resin into between reinforcing fibers, there are employed a method in which a reinforcing fiber and a thermoplastic fiber are used in the form of a woven or knitted fabric prepared by alternately weaving or knitting the reinforcing fiber and the thermoplastic matrix imparted with a fiber form, and a method in which a thermoplastic matrix is powdered and covered on a reinforcing fiber. However, these methods require a high cost for processing materials, and eventually, the material cost increases.

The above filament winding method, tape lay-up method and pultrusion method find it difficult to produce an ultralight-weight article from a material having a sandwich structure in which a light-weight core material is sandwiched. Further, the surface properties of a molded article are insufficient. A cylindrical article produced by a pultrusion method have inner and outer diameters which are greatly eccentric and requires secondary machining.

It is therefore an object of the present invention to provide a fiber-reinforced thermoplastic resin sheet.

It is another object of the present invention to provide a fiber-reinforced thermoplastic resin sheet which has a light weight and a small thickness and which has excellent mechanical properties.

It is further another object of the present invention to provide a fiber-reinforced thermoplastic sheet which is formed of a continuous carbon fiber woven or knitted fabric and a heat-resistant fiber structure material, which substantially does not have voids, and which has excellent mechanical properties.

It is still further another object of the present invention to provide a flame-resistant, fiber-reinforced thermoplastic resin sheet which not only has the above excellent properties but also has improved flamability.

It is still further another object of the present invention to provide a flame-resistant, fiber-reinforced thermoplastic resin sheet having a high fiber volume fraction.

It is yet another object of the present invention to provide a process for producing the above fiber-reinforced thermoplastic sheet of the present invention.

Further, it is another object of the present invention to provide a process for easily producing a curved sheet, from which an ultralight-weight, cross-sectionally highly circular and design-wise excellent cylinder can be produced, as a fiber-reinforced thermoplastic sheet by means of a universal apparatus such as a flat press machine.

Other objects and advantages of the present invention will be apparent from the following description.

According to the present invention, the above objects and advantages of the present invention are achieved, first, by a fiber-reinforced thermoplastic sheet comprising at least one first layer formed by impregnating a woven or knitted fabric of continuous carbon fibers with a thermoplastic matrix resin and at least one second layer formed by impregnating a fiber structure material of a heat-resistant fiber with a thermoplastic matrix resin, the above first layer(s) and the second layer(s) being laminated integrally, the second layer having the heat-resistant fibers substantially uniformly distributed in the matrix resin in the cross section of the sheet and substantially having no voids of which the diameter exceeds the fiber diameter of the heat-resistant fibers, the fiber structure material, used in the second layer, having a fiber-entangling (fiber-interaction) strength of at least 1.0 kg/mm² in any directions crossing at right angles.

The fiber-reinforced thermoplastic sheet of the present invention comprises at least one first layer and at least one second layer as described above.

The first layer is formed by impregnating one continuous fiber woven or knitted fabric of a carbon fiber with a thermoplastic matrix resin.

The continuous fiber woven or knitted fabric of a carbon fiber is not specially limited, and a commercially available plain weave fabric, twill weave fabric and woven roving of a continuous fiber can be preferably used.

The thermoplastic resin is preferably selected from polyethylene, polypropylene, polyvinyl chloride, polystyrene, polycarbonate, polyethylene terephthalate, polybutylene terephthalate, polybutylene terephthalate, nylon 6, nylon 66, polyphenylene sulfide, ABS and a copolymer formed from at least two of the structural units of these polymers. The thermoplastic resin may contain additives such as a colorant, a stabilizer, a plasticizer, a flame retardant and an ultraviolet light absorber.

The second layer is formed by impregnating one fiber structure material of a heat-resistant fiber with a thermoplastic matrix resin.

The heat-resistant fiber is required to be constituted of a material which can retain rigidity in a hot press molding which will be described later. For this requirement, it is preferred to use a heat-resistant fiber formed from a material having a glass transition point (Tg) of at least 150° C.

As the above heat-resistant fiber, it is preferred to use an organic heat-resistant fiber selected from the group consisting of meta-type aramid fibers, para-type aramid fibers, a polyacrylate fiber, a polyacrylonitrile fiber, a polybenzimidazole fiber, a polyethylene terephthalate fiber, a polyethylene-2,6-naphthalate fiber and a cellulose fiber.

The fiber structure material of the above heat-resistant fiber may have various forms, e.g., of bulky woven or knitted fabric, nonwoven fabric and mat. Of these forms, the form of a nonwoven fabric or mat is preferred.

In the present invention, the above fiber structure material is required to have a fiber-entangling strength of at least 1.0 kg/mm2 in directions crossing at right angles, for example, in two directions lengthwise and widthwise. When the fiber-entangling strength is less than 1.0 kg/mm², the heat-resistant fiber flows out heavily during the molding in an open mold, and there are caused various problems of nonuniformity in the sheet thickness and sheet quality, disorder of a continuous fiber woven or knitted fabric of a carbon fiber and requirement of machining of a flash formed by flow-out. The fiber-entangling strength is preferably at least 1.5 to 10 kg/mm².

For imparting the fiber structure material with a fiber-entangling strength of at least 1.0 kg/mm², for example, a method in which the heat-resistant fiber is crimped to a web form and further needled is effective. A nonwoven fabric or mat formed from this crimped fiber is bulky. This bulkiness improves the impregnation properties of a thermoplastic resin, and works effectively to stably produce a sheet having a light weight and excellent mechanical properties. Further, the needling gives an additional advantage that handlability of the fiber structure material is improved. As a suitable fiber structure material imparted with entangling by the above needling, there is a span lace produced by applying water jet needling to a web of a crimped meta-type aramid fiber. The method of imparting a fiber-entangling strength higher than the predetermined value at a high temperature shall not be limited to the method using the above needling.

The above fiber structure material before impregnation of a thermoplastic resin preferably has a bulkiness of at least 8, more preferably 10 to 20.

When a fiber structure material having a bulkiness of less than 8 is used, the impregnation of a resin is liable to be insufficient, and the fiber volume fraction of a carbon fiber cloth layer decreases. Further, the carbon fiber cloth layer sometimes moves toward the inside and/or one side of the sheet. Therefore, the resultant sheet frequently shows a decrease in mechanical properties.

The thermoplastic resin used in the second layer is selected from the above thermoplastic resins used in the first layer. The polymer of the heat-resistant fiber is required to have a higher melting point than the thermoplastic matrix resin.

The fiber-reinforced thermoplastic sheet of the present invention has at least one first layer and at least one second layer. When a plurality of the first layers and a plurality of the second layers are alternately present, for example in the order of first layer/second layer/first layer . . . , these first and second layers are integrally laminated. When a plurality of first layers are present adjacently, a plurality of the first layers are integrally laminated. When a plurality of second layers are present adjacently, a plurality of the second layers are integrally laminated. Further, the first layer(s) and the second layer(s) are also integrally laminated. In the sheet of the present invention, the thermoplastic resin for the first layer and the thermoplastic resin for the second layer may be the same or different. These thermoplastic resins are preferably the same.

The sheet of the present invention has a heat-resistant fiber substantially uniformly distributed in the matrix resin, and substantially does not have voids having a size exceeding the fiber diameter of the heat-resistant fiber.

That is, the sheet of the present invention has a heat-resistant fiber substantially uniformly distributed in the matrix resin in the cross section of the sheet, and does not have any voids having a size exceeding the fiber diameter of the heat-resistant fiber. The cross section of the sheet is advantageously observed through a microscope, for example, at a magnification ×85.

One index for the substantial uniform distribution of the heat-resistant fiber in the matrix resin is that the sheet cross section has at least one heat-resistant fiber in an imaginary square form having sides 10 times as large as the diameter of the heat-resistant fiber. The sheet cross section is observed through a microscope at a magnification, e.g., of ×150 to ×600, whereby the distribution of the heat-resistant fiber in the matrix resin can be easily observed.

In the fiber-reinforced thermoplastic sheet of the present invention, the structure of the heat-resistant fiber exhibits a fiber-entangling strength or at least 1 kg/mm$^2$, the heat-resistant fiber is substantially uniformly distributed in the matrix resin, and the sheet substantially does not have any voids. Due to these, the fiber-reinforced thermoplastic sheet of the present invention has attained excellent mechanical properties which cannot or hardly cannot achieved by conventional sheets.

For stably producing a fiber-reinforced thermoplastic resin sheet having excellent mechanical properties, it is important to form a laminate structure in which the fiber structure material of the second layer of the heat-resistant fiber is sandwiched between two first layers of a continuous fiber woven or knitted fabric. Due to the above laminate structure, s "undillation" which is likely to occur when a long fiber woven or knitted fabric is molded without fiber structure material can be easily prevented, and the continuous fiber woven or knitted fabric in a uniformly arranged and tightened state is retained in the sheet surface layer portion. As a result, the sheet stably exhibits excellent mechanical properties in particular.

The fiber structure material of the heat-resistant fiber used in the present invention functions not only to prevent "undulation" of the continuous fiber woven or knitted fabric, but also to increase the moldability of the fiber-reinforced thermoplastic resin sheet. In order to obtain such functions remarkably, it is preferred to use a fiber structure having a high bulkiness and repellency, and it is more preferred to use a nonwoven or unknitted fabric which is formed from a crimped fiber and has a high fiber-entangling strength.

The low density of the heat-resistant fiber in the fiber structure material, i.e., high bulkiness, is an important factor for obtaining a sheet having a lowered sheet density and a decreased weight and having highly excellent properties and a molded article produced from the sheet.

A study of the present inventors has showed the following: A sheet formed by integrally laminating a first layer containing a continuous carbon fiber woven or knitted fabric, a second layer containing a needling nonwoven or unknitted fabric formed of a crimped aramid short fiber, and a first layer containing a continuous carbon fiber woven or knitted fabric in this order is particularly suitable, since this sheet is excellent in heat moldability (formability) and a molded article obtained therefrom is excellent in mechanical properties and surface properties.

A study of the present inventors has further revealed the following. The fiber structure material of the heat-resistant fiber is required to be substantially dispersed in the matrix resin, and have a structural index, which will be defined later, in the range of 1 to 10 g/min. These requirements are important for the fiber structure material to be without voids having a size larger than the diameter or the heat-resistant fiber. When there is used a fiber structure material like a glass mat in which no single fiber is present in an imaginary square form having sides 10 times as large as the fiber diameter, or when the structural index is more than 10 g/min, many voids are present within the molded sheet or on its surface. These voids are considered to vacuum voids due to shrinkage of the matrix resin when the sheet is cooled and/or voids formed due to a wet-through of the matrix resin during molding under pressure. In contrast, when fiber structure material is formed of a needling nonwoven or unknitted fabric, the fiber is substantially uniformly distributed to prevent the wet-through of the matrix resin, and the resin wetting length of the fiber structural material increases even if the fiber amount, e.g. in the needling nonwoven or unknitted fabric is the same as the fiber amount, e.g. in the glass mat. Therefore, the structural index, which is considered to show the impregnation properties of the matrix resin, is brought into the optimum range of 1 to 10 g/min.

The impregnation of the matrix resin is so improved during the press-molding, and at the same time, the fiber structure materials are uniformly dispersed. Therefore, vacuum voids, which are caused due to the shrinkage of the resin when the sheet is cooled, are hardly occur.

In the sheet of the present invention, the total amount of the continuous carbon fiber woven or knitted fabric and the fiber structure material of the heat-resistant fiber is 30 to 70% by volume based on the sheet amount.

According to the present invention, the following has been revealed. When the heat-resistant fiber is a polymer which is meltable, has a limiting oxygen index of at least 28% and exhibits no affinity to the thermoplastic resin as a matrix resin, for example, when the heat-resistant fiber is the above meta-type aramid fiber, a flame-resistant, fiber-reinforced thermoplastic sheet can be provided.

Therefore, according to the present invention, secondly, there is provided a flame-resistant, fiber-reinforced thermoplastic sheet comprising at least one first layer formed by impregnating a woven or knitted fabric of heat-resistant reinforced fibers with a matrix resin of a thermoplastic resin and at least one second layer formed by impregnating a fiber structure material of a heat-resistant fiber with a matrix resin of a thermoplastic resin, the above first layer(s) and the second layer(s) being laminated integrally, the second layer having the heat-resistant fibers substantially uniformly distributed in the matrix resin in the cross section of the sheet and substantially having no voids of which the diameter exceeds the fiber diameter of the heat-resistant fibers, the fiber structure material, used in the second layer, having a fiber-entangling strength of at least 1.0 kg/mm$^2$, preferably 1.5 to 10 kg/mm$^2$ in any directions crossing at right angles, the heat-resistant fiber of the fiber structure material being formed of a polymer which is meltable, has a limiting oxygen index of at least 28%, and exhibits no affinity to the thermoplastic resin of the matrix resin while it is in a molten state.

The flame-resistant, fiber-reinforced thermoplastic sheet of the present invention has its main feature in the use of the fiber structure material composed of a heat-melting heat-resistant organic fiber which satisfies the following two conditions: (a) It does not show affinity, typically compatibility, with the matrix resin when it is in a molten state and (2) it has a limiting oxygen index, in a combustion test, of at least 28%, preferably 30% or more.

For example, non-melting materials such as a glass fiber, a carbon fiber and a paraffinic aramid fiber as a heat-resistant reinforced fiber of the fiber structure material so inhibit the dripping behavior of the matrix resin (constituting a fiber-reinforced resin sheet), which promotes flame resistance, as a reinforcing carbon fiber material incorporated for reinforcement does when the matrix resin is melted at a flaming time. Further, the fiber structure material of the heat-resistant fiber also works to enlarge the contact area of the matrix resin to air in atmosphere. Therefore, a fiber-reinforced plastic sheet containing such a non-melting material tends to show a decrease in flame resistance.

Further, even when a polymer which has a sufficiently high limiting oxygen index and is melting in flaming is used as a fiber structure material of the fiber-reinforced resin sheet, the fiber structure material having a high limiting oxygen index exhibits a flame-resistant effect only if it does not have affinity, particularly compatibility, with the matrix resin being molten when the sheet is flamed. A material, having a low limiting oxygen index used as a fiber structure does not have any flame-resistant effect, and naturally, the fiber-reinforced resin sheet is not at all improved in flame resistance.

Therefore, as a fiber structure material in the flame-resistant, fiber-reinforced thermoplastic sheet of the present invention, it is preferred to use a sheet-shaped material of a heat-melting organic fiber which does not have affinity, particularly compatibility, with the matrix resin when it is melted, and has a limiting oxygen index of at least 28% particularly at least 30%.

The "limiting oxygen index (LOI)" used in the present specification refers to a value obtained by the measurement in the heat resistance test described in JIS-K-7201. The heat-melting organic fiber having a limiting oxygen index of at least 28% preferably includes polymer fibers such as a meta-type aramid fiber, a polyetherimide fiber, a polyphenylene sulfide fiber, a liquid crystal polyester fiber and a polyarylate fiber. Of these, a meta-type aramid fiber is particularly preferred. These fibers may contain a colorant, a stabilizer and a flame retardant as required unless the above conditions are removed.

The content of the fiber structure material of the above heat-resistant fiber having a high limiting oxygen index is properly 10 to 20% by volume. When this content is less or more than the above range, the sheet tends to show a decrease in the flame-resistance. The fiber structure material preferably has a thickness of 50 to 400 $\mu$m per layer.

For the flame-resistant, fiber-reinforced thermoplastic sheet of the present invention, the thermoplastic resin of the matrix resin can be selected from the already described resins. The matrix resin can be also selected from matrix resins of flame resistance grade to which a flame retardant is incorporated to such an extent that the mechanical properties and the electrical properties are not impaired. The sheet of the present invention can be more improved in flamability by improving the constituting matrix resin per se in flamability.

It is utterly unexpected that the fiber-reinforced resin sheet as a whole has been greatly improved in flamability due to the presence of the fiber structure material of the specific organic fiber inside the sheet as described above. It has been considered difficult to render a fiber-reinforced resin sheet having a high fiber volume fraction ($V_f$) (e.g., a sheet having a $V_f$ of 50 to 70%) flame resistance. The present invention which has enabled the improvement of such a fiber-reinforced resin sheet in flamability is greatly significant.

In addition, it should be understood that the description of the foregoing aspect of the present invention (the fiber-reinforced thermoplastic sheet) can be applied to the flame-resistant, fiber-reinforced thermoplastic sheet unless otherwise specified.

According to the present invention, the fiber-reinforced thermoplastic sheet (including the flame-resistant, fiber-reinforced thermoplastic sheet) of the present invention can be advantageously produced by a process which comprises stacking at least one continuous carbon fiber woven or knitted fabric and at least one fiber structure material of the heat-resistant fiber having a fiber-entangling strength of at least 1.0 kg/mm$^2$ in any directions crossing at right angles, and molding the resultant laminate under heat and pressure in the presence of a thermoplastic resin at a temperature equal to or higher than a temperature at which the thermoplastic resin is softened.

In the above molding under heat and pressure, the thermoplastic resin is used in the form, for example, of a powder, a woven or knitted fabric, a film or a sheet. Particularly preferred is the form of a film or a sheet.

Further, the above molding lender heat and pressure is preferably carried out in the presence of the thermoplastic resin having the form of any one of a sheet, a film, a woven or knitted fabric and a powder between the continuous carbon fiber woven or knitted fabric and the fiber structure material of a heat-resistant fiber.

For the molding under heat and pressure, the sheet structure as a whole is, for example, as follows. At least two of the continuous carbon fiber woven or knitted fabrics and at least one of the fiber structure materials of a heat-resistant fiber are stacked such that at least one of the fiber structure materials is placed between at least two of the carbon continuous fiber woven or knitted fabrics and that the thermoplastic resin is placed between each continuous carbon fiber woven or knitted fabric and each fiber structure material. More specifically, at least two of the continuous carbon fiber woven or knitted fabrics and at least one of the fiber structure materials are preferably stacked in the order of thermoplastic resin film/continuous carbon fiber woven or knitted fabric/thermoplastic resin film/fiber structure material of heat-resistant fiber/thermoplastic resin film/continuous carbon fiber woven or knitted fabric/thermoplastic resin film.

In the impregnation of the thermoplastic resin into the continuous fiber woven or knitted fabrics and the fiber structure material and the integration of these, the temperature therefor is required to be equal to, or higher than, a temperature at which the matrix resin (thermoplastic resin) is softened and melted. Differing depending upon the polymer of the matrix resin, the above temperature is preferably in the range between Tg+50° C. and thermal decomposition temperature −20° C. The pressure for the molding is preferably not less than 10 kg/cm$^2$. The molding under heat and pressure is not always required to be carried out under vacuum. When the molding is carried out under vacuum, advantageously, air bubbles scarcely remain.

In the present invention, it is preferred to use the fiber structure material of a heat-resistant fiber having a structural index of 1 to 10 g/min. The use of the fiber structure material having such a structural index greatly facilitates the above impregnation and composition of the resin and eases the production of the sheet of the present invention.

The fiber-reinforced thermoplastic sheet of the present invention has a thickness of at least 0.2 mm, preferably 0.5 to 2 mm.

According to the above process of the present invention, at least two of the continuous fiber woven or knitted fabrics and at least one of the fiber structure materials are stacked such that the materials and stacking sequence are symmetrical in the stacking direction with regard to a plane, and the resultant laminate is molded with under heat and pressure with a flat press machine, whereby the sheet of the present invention can be obtained in the form of a flat plate.

Further, at least two of the continuous fiber woven or knitted fabrics and at least one of the fiber structure materials are stacked such that the materials and/or stacking sequence are not symmetrical in the stacking direction with regard to a plane, and the resultant laminate is molded under heat and pressure with a flat press machine, whereby the sheet of the present invention can be obtained in the form of a spontaneously curved sheet.

In the above first method for obtaining the sheet of the present invention in the form of a flat plate, at least two of the continuous fiber woven or knitted fabrics and at least one of the fiber structure materials are stacked before the molding tinder heat and pressure such that the materials and stacking sequence are symmetrical in the stacking direction with regard to a plane. For example, in a laminate formed by placing one fiber structure material between two continuous fiber woven or knitted fabrics of the same kind, the materials and stacking sequence are symmetrical in the stacking direction with regard to the fiber structure material as a central plane (plane symmetry). In a laminate formed by placing one fiber structure material between two continuous fiber woven or knitted fabrics of different kinds, the materials and the stacking sequence are asymmetrical with regard to the fiber structure material as a central plane (not plane symmetry).

Another embodiment which is asymmetrical with regard to a plane is a laminate which is formed of the same material but has a different stacking sequence like a laminate formed by placing one fiber structure material between one woven or knitted fabric and one nonwoven or unknitted fabric.

In general, the larger the degree of asymmetry is, the higher the spontaneous curving effect of the sheet is. For example, a combination each of different materials and different stacking sequence preferably gives a higher spontaneous curving effect.

When a curved sheet is produced from the continuous carbon woven or knitted fabric which has the same performance lengthwise and widthwise (e.g. plain woven fabric), the carbon fiber arrangement direction is preferably set in the bias direction of nearly ±45° with regard to the length direction of the curved sheet. On the other hand, when the continuous carbon fiber woven or knitted fabric is different in performance lengthwise and widthwise (e.g. satin weave) is preferably set nearly in the parallel and right-angled directions with regard to the length direction of the curved sheet. For the production of a curved sheet, the heat-resistant fiber of the fiber structure material is preferably selected from a meta-type aramid fiber and a glass fiber.

When a laminate which is asymmetrical with a plane as described above is pressed under heat, there is obtained a sheet which is carved in the direction of about 45° to the arrangement direction of the reinforcing fiber. The radius of curvature can be properly adjusted by selecting a combination of fiber layers, the resin kind and heating and pressing conditions.

The so-obtained curved sheet can be used for a variety of purposes according to its form, and particularly useful as a material for producing cylinders.

That is, both edges of the curved sheet are attached to each other and bonded together with an adhesive, mechanically or by fusing them under heat. In this manner, a cylinder can be easily produced. The curved sheet of the present invention has one characteristic feature in that it permits bonding by fusion under heat due to the use of the thermoplastic resin. Further, a bonding portion having no step in an outer surface level can be provided by attaching a sheet of the same material to the bonding portion in the interior of the cylinder and bonding the edges of the curved sheet through the attached sheet.

The above cylinder formed directly from the curved sheet does not have high mechanical strength, since it is formed of the sheet having a relatively small thickness. However, a light-weight, rigid and thick cylinder having a sandwich structure can be produced by preparing cylinders having different diameters from the curved sheet, concentrically placing the cylinder having a smaller diameter inside the cylinder having a little larger diameter, and injecting a light-weight forming resin in a gap between the cylinders. The strength, rigidity, etc., of the cylinder can be adjusted by designing the performance and thickness of the curved sheet and thickness of the foaming resin according to values required of the cylinder. For example, a fiber-reinforced thermoplastic resin cylinder having a diameter of 200 mm and a sandwich structure having a total thickness of about 6 mm, shown in Example 7 which will follow later, has a cylinder density of 0.45 to 0.6 (g/cm$^3$) and a compressive strength, in the diameter direction, of approximately 100 to 200 kg/mm$^2$.

For producing a high roundness cylinder by the above method, it is preferred to employ following steps: (1) cylinders formed of a curved thin sheet are respectively set in the mold consisting of an inner cylindrical mold and an outer cylindrical mold; (2) The mold (inner and outer cylindrical molds) and cylinders (formed of a curved thin sheet) are heated to a temperature equal to, or higher than, the second order transition point (Tg) of the thermoplastic resin constituting the thin sheet of the cylinder, preferably to a temperature between Tg+10° C. and Tg+50° C.; and (3) After heating the mold and cylinders, a foaming resin is injected into a gap between the cylinder having a larger diameter and the cylinder having a smaller diameter. When the roundness of a cylinder prepared at a room temperature by injection of a foaming resin and the roundness of a cylinder prepared at a heated condition by injection of a foaming resin, the temperature equal to, or higher than, the Tg of the thermoplastic resin constituting the curved sheet of the cylinder, are compared to each other, the roundness of the cylinder prepared at heated condition by injection of foaming resin is remarkably improved over the roundness of the other cylinder.

In the other hand, when the Tg of the thermoplastic resin constituting the curved thin sheet of the cylinder is lower than the temperature at which the foaming resin to be injected has heat resistance and foaming performance, the foaming resin is injected while the mold in which the cylinders are contained is set at room temperature, and then the mold is held in an atmosphere at a temperature equal to, or higher than, the Tg of the above thermoplastic resin, whereby the roundness of the molded cylinder can be improved. It is practically very useful in terms of control of performances such as workability of the foaming resin and density of the molded cylinder that the foaming resin can be injected at room temperature. Further, the expanding power of the foaming resin can be naturally and stably utilized by heating the mold before or after the injection of the foaming resin.

For producing a cylinder having a sandwich structure, it is preferred to bond the sides of a curved sheet with a thermoplastic adhesive which exhibits adhesion properties at a relatively low temperature. In a step of producing a cylinder having a sandwich structure, cylinders of the thin sheet and a mold for cylinders are heated and cooled. The sheet to be molded and the mold (a metal mold is generally used) are different in the material quality, and have different coefficients of heat expansion. Therefore, in a state of a temperature increased by the heating of the mold including the thin curved sheet and the heat generation of the foaming resin, the bonding force of the bonded portion is required to decrease so that the cylinders can smoothly shift correspondingly to a difference in coefficient of thermal expansion between the sheet of the cylinder and the mold. A study of the present inventors has shown that the use of a thermoplastic adhesive for the bonding is the most preferred. In contrast, when the sheet edges are bonded with a thermosetting adhesive or by fusion, a local backing of the sheet is often liable to occur in the circumferential direction. The larger the cylinder diameter is and the higher the heating temperature is, the more often the local backing of the sheet occurs.

The fiber-reinforced thermoplastic resin sheet of the present invention has been explained concerning the use thereof as an inner cylinder and an outer cylinder which constitute a cylinder having a sandwich structure. The use of the sheet shall, naturally, not limited only thereto. The curved sheet can be used for forming an inner cylinder alone or an outer cylinder alone, and the carved sheet itself can be used as a cover and as other molding material for forming a molded article other than the cylinder.

The curved sheet of the present invention is also very useful as a material for forming a cylinder other than the cylinder having a sandwich structure. That is, a cylindrical molded article is frequently required to have mechanical properties such as vibration properties and fatigue besides strength and rigidity and to have a relatively thin-wall cylinder. The curved sheet of the present invention is very useful for forming such a solid-structured cylinder of a fiber-reinforced thermoplastic resin sheet.

That is, (a) since the constituent substrate of the sheet of the present invention is curved long the cylinder diameter of a molded article, a number of the sheets can be easily stacked, and no internal strain remains in a molded cylinder. (b) Since the sheet of the present invention is a thermoplastic resin thin sheet completely impregnated with a thermoplastic resin, a cylinder having a thick wall can be advantageously produced by simply stacking the thin sheets. Therefore, a high-performance solid-structured fiber-reinforced plastic cylinder having a wall thickness of 3 to 5 mm can be easily produced, for example, by a thermal expansion molding (TEM) method in which there is used a mold set designed so as to provide a difference in coefficient of thermal expansion between an inner cylindrical mold and an outer cylindrical mold by forming the inner cylindrical mold from a material having a higher coefficient of thermal expansion and the molds are heated at a temperature equal to, or higher than, the Tg of the thermoplastic resin constituting the curved sheet. For example, one embodiment of the TEM method is described in Example 9 which will follow later. In this method, there can be produced a cylinder which has a higher density than a cylinder having a sandwich structure and yet an excellent roundness and which has a thin wall of about 3 mm thickness and yet a high rigidity.

As described above, the fiber-reinforced thermoplastic resin sheet of the present invention has excellent mechanical properties and excellent moldability, and can be molded (formed) into a variety of forms by placing it in a mold like conventional stampable sheets. For example, it can be molded into a variety of articles usable as an automobile part and structural material, a housing for a variety of electric appliances, a parabola antenna, a bag, an interior material, a protection material and a piece of sport goods.

Products obtained by hot-pressing (forming) the sheet of the present invention as described above have excellent mechanical properties.

The curved sheet of the present invention can be easily produced into a thin-wall cylinder by bonding its edges, and can be also produced into a thick-wall sol-id-structured cylinder by TEM method and a sandwich-structured cylinder formed from larger and smaller thin-wall cylinders and a core material. These cylinders can be widely used as a member for furniture such as a leg of a chair and a leg of a table, a part of a musical instrument such as a drum shell and a tambourine frame, and a piece of interior decoration goods such as an indoor-use flower pot, and it can be also used in industrial fields. The curved sheet of the present invention can be also widely used as a substrate for molded articles other than cylinders and as a cover.

In the present invention, various physical property values are defined or measured in the following manner.

Fiber-entangling Strength of Fiber Structure Material

A fiber structure material such as a non-woven fabric was measured for a fiber-entangling strength by the following method.

A fiber structure material of a heat-resistant fiber was cut to a sample piece having a width of 10 mm and a length of 100 mm. The tabs of sample were fixed with a heat-resistant tape on both ends (gauge length 100 mm) and subjected to a tensile test (tensile rate 11 mm/minute) at a temperature around a molding temperature (250° to 300° C.). The above tensile test was repeated five times, and the average of the breaking stress values was taken as a fiber-entangling strength.

Bulkiness of Fiber Structure Material

The bulkiness of a fiber structure material was defined by the following equation.

$$\text{Bulkiness} = T/(W/\rho) \times 1{,}000$$

[T: thickness of a fiber structural material (mm)
W: weight per unit area of a fiber structural material (g/m$^2$)
$\rho$: density of fiber composing the fiber structural material (g/cm$^3$)]

In the above equation, the thickness value was the average value obtained by applying a load of 20 g/cm$^2$ on a fiber structure material and measuring its thickness in five places with a thickness measuring apparatus 10 second after the application according to JIS L1085 (a nonwoven interlining test method).

Structural Index of Fiber Structure Material

The "structural index" of the fiber structure material refers to the resistance of the fiber structure material against the matrix resin flowing through the fiber structure material, and was measured by the following method.

A punching plate having an opening ratio of at least 50% was set in the bottom portion of a cylinder having an internal diameter of 50 mm to support the fiber structure material. Then, 1 to 5 sheets of the fiber structure material cut to meet the internal diameter of the cylinder were set on the plate so that these sheets were tightly in contact with the internal wall of the cylinder. One hundred (100) ml of a liquid, e.g., glycerin, having a liquid viscosity of 30 cps (at 16°–17° C.) was poured in the cylinder in which the fiber structure material had been set. The amount of the liquid which passed the fiber structure material per unit time (1 minute) was measured, and the measured value was taken as a structural index (g/m).

The above measurement was conducted at an ambient temperature of 16° to 17° C., and the specific gravity, $\rho$, of the liquid was set at 1.24 (g/cm$^3$). Further, in the above measurement, the volume fraction of the fiber structure material in the thickness direction, {Weight/fiber true specific gravity]$\times 10^{-3}$/thickness of fiber structure material}, was about 0.1.

The present invention will be explained hereinafter by reference to Examples. However, the present invention shall not be limited to these Examples.

EXAMPLE 1 AND COMPARATIVE EXAMPLE 1

Two plain woven cloths of carbon fiber (continuous fiber) (C/06343, supplied by Toray Industries, Inc., Weight 198 g/m$^2$), 2 span laces (Weight 60 g/m$^2$, bulkiness 9, entangling strengths lengthwise and widthwise at least 1.5 kg/mm$^2$ measured at 280° C., LOT 30%, structural index 3) prepared by crimping a meta-aramid fiber ("TEIJINCONEX", registered trade name, supplied by Teijin Limited), carding it and subjecting it to water jet needling, and five polycarbonate films (films from a polycarbonate film "Panlite" (trade name) L-1250, supplied by Teijin Chemicals, Ltd, LOI 24.9%) were prepared.

The above materials were laminated in the order of polycarbonate film/plain woven cloth of carbon fiber/polycarbonate film/span lace of meta-aramid fiber/polycarbonate film/span lace of meta-aramid fiber/polycarbonate film/plain woven cloth of carbon fiber/polycarbonate film.

The above-obtained laminate was hot-press molded in an open mold at 300° C. for 30 minutes to give a fiber-reinforced polycarbonate sheet having a thickness of 0.75 mm.

The laminate showed excellent moldability, and a flash and disorder of the carbon fiber cloth were hardly observed. The above-obtained sheet had a specific gravity of 1.36, a total $V_f$ of 50, a flexural strength of 60 kg/mm$^2$ and a flexural modulus of 4,000 kg/mm$^2$, and it was light in weight and excellent in mechanical properties.

For comparison (Comparative Example 1), a fiber-reinforced polycarbonate sheet having a thickness of 0.75 mm was prepared from two plain woven cloths of a carbon fiber and polycarbonate films (without using span laces of a meta-aramid fiber) under the same conditions as above. The so-obtained sheet had a specific gravity of 1.36 and a total $V_f$ of 35, while its flexural strength was 50 kg/mm$^2$ and its flexural modulus was 2,000 kg/mm$^2$.

The above data clearly shows the following. Due to the presence of the span lace of a meta-aramid fiber between the plain woven cloths of a carbon fiber, the reinforcing effect of the reinforcing fiber effectively worked in the sheet according to the present invention although it had the same specific gravity as that of the sheet containing no span lace. In particular, the sheet according to the present invention showed improved properties in terms of flexural modulus.

EXAMPLE 2 AND COMPARATIVE EXAMPLES 2 AND 3

Laminates were prepared in the same manner as in Example 1 except for the use of two fiber structure materials shown in Table 1 and five nylon 6 films in place. The so-prepared laminates were respectively molded in an open mold at 290° C. for 30 minutes to give fiber-reinforced nylon 6 sheets.

TABLE 1

| Fiber structure | Constitution of fiber structure material | Fiber-entangling strength (kg/mm$^2$) lengthwise | Fiber-entangling strength (kg/mm$^2$) widthwise | Bulkiness | Structural index (g/min.) |
|---|---|---|---|---|---|
| 1 | "TEIJINCONEX" span lace I | 2.4 | 1.5 | 9 | 3 |
| 2 | "TEIJINCORNEX" span lace II | 2.9 | 0.7 | 9 | 7 |
| 3 | Glass fiber surfacing mat | 0.14 | 0.14 | 17 | 20 |

In the above fiber structure materials, the "TEIJTNCONEX" span lace I was so prepared as to have an increased fiber-entangling strength by increasing the number of water jet needling application, and the "TEIJINCONEX" span lace II was prepared so prepared as to have a low entangling strength by altering the fiber arrangement directions and decreasing the number of water jet needling application. As the glass fiber surfacing mat, SM3603 (Weight 60 g/m$^2$) supplied by Asahi Fiber Glass Company Limited was used.

The mechanical properties of the above-obtained fiber-reinforced resin sheets greatly depended on the plain woven cloth of a carbon fiber, and did not much differ. However, in other sheet properties and moldability, a variety of differences were observed as shown in Table 2 due to a difference in fiber-entangling strength among the heat-resistant fibers present between the plain woven cloths of a carbon fiber.

TABLE 2

| | Fiber structure No. | Test Piece | Average sheet thickness (mm) | Maximum thickness − minimum thickness (mm) | Flash amount (%) | Ratio of cloth disorder (%) | Total $V_f$ (%) |
|---|---|---|---|---|---|---|---|
| Ex. 2 | 1 | A | 0.671 | 0.175 | 13 | 7 | 50 |
| CEx. 2 | 2 | B | 0.567 | 0.220 | 26 | 33 | 50 |
| CEx. 3 | 3 | C | 0.667 | 0.217 | 13 | 35 | 48 |

In Table 2, the flash amount shows a ratio obtained by diving the amount of flash pressed out of the plain woven cloth of a carbon fiber by the total weight of the sheet. The ratio of cloth disorder shows a ratio obtained by dividing the area of a disorder portion of the plain woven cloth of a carbon fiber by the total area of the cloth.

The test piece A according to the present invention (Example 2) showed small values of the flash amount and the cloth disorder. In the test piece B (Comparative Example 2), however, part of the fiber structure material flowed out during the molding to decrease the thickness of the sheet, and it was therefore difficult to control the thickness. Further, the test piece B showed instability in mechanical properties due to the variability of thickness in the flow-out portion, and a disorder caused by flow-out of the fiber structure material was observed at an edge portion of the surface cloth. The test piece C (Comparative Example 3) extremely showed a disorder of the surface cloth and variability in the sheet thickness due to a low fiber-entangling strength in the lateral direction.

EXAMPLE 3 AND COMPARATIVE EXAMPLES 4–6

A laminate obtained by stacking two plain woven cloths of a carbon fiber (c/o6343, supplied by Toray Industries, Inc., Weight 198 g/m$^2$) and three polycarbonate films (film from polycarbonate resin "Panlite" (registered trade name) L-1250, supplied by Teijin chemicals, Ltd) was pressed at 280° to 310° C. under a pressure of 20 to 40 kg/cm$^2$ to prepare a fiber-reinforced resin sheet (test piece 1, Comparative Example 4) having a total fiber content ($V_f$) of about 50% by volume). The above laminate was obtained by stacking the plain woven cloths of a carbon fiber (to be sometimes referred to as "C" hereinafter) and the polycarbonate films (to be sometimes referred to as "P" hereinafter) in the order of P/C/P/C/P.

A laminate obtained by stacking two plain woven cloths of a carbon fiber which were the same as above, five polycarbonate films which were the same as above and two glass fiber surfacing mats (SM3603, supplied by Asahi Fiber Glass Company Limited, Weight 60 g/m$^2$, to be sometimes referred to as "G" hereinafter) which were the same as in Comparative Example 3 in the order of P/C/P/G/P/G/P/C/P was pressed under the same conditions as above to give a fiber-reinforced resin sheet having nearly the same $V_f$ (test piece No.2, Comparative Example 5).

Further, a laminate obtained by stacking P, C and two needle-punched nonwoven fabrics (LOI about 30) of a meta-aramid (poly-m-plienyleneisophthalamide) fiber ("TEIJINCONEX", weight about 60 g/m$^2$, to be sometimes referred to as "M" hereinafter) which was the same as in Example 1 in the order of P/C/P/M/P/M/P/C/P was pressed under the same conditions as above to give a flame-resistant, fiber-reinforced plastic sheet having $V_f$ of about 50% (test piece No.3, Example 3).

The polycarbonate film used as a matrix resin material (Comparative Example 6) and the above test pieces Nos. 1 to 3 were respectively subjected to an flame-resistant evaluation. Table 3 shows the results.

TABLE 3

| Sheet | | Flame retardancy |
| --- | --- | --- |
| CEx. 6 | polycarbonate film | V-2 |

TABLE 3-continued

| Sheet | | Flame retardancy |
| --- | --- | --- |
| CEx. 4 | test piece No. 1 | HB |
| CEx. 5 | test piece No. 2 | HB |
| Ex. 3 | test piece No. 3 | V-1 |

As is clearly shown in Table 3, the matrix resin (polycarbonate film) constituting the sheet exhibited a flame resistance of V-2, whereas the flame resistance each of the test pieces No.1 and No.2 was reduced to HB grade due to the effect of the reinforcing fiber. In contrast, the test piece No.3 according to the present invention exhibited flame resistance (V-1 grade), which is excellent over that of the constituting matrix resin.

EXAMPLE 4 AND COMPARATIVE EXAMPLES 7 AND 8

Example 3 and Comparative Examples 4 and 5 were repeated except that the matrix resin (polycarbonate films) was replaced with a flame-retardant polycarbonate prepared by adding a flame retardant into polycarbonate (films formed from "Panlite" LN-1250, supplied by Teijin Chemicals, Ltd) to give fiber-reinforced plastic sheets. Table 4 shows the results of evaluation of these sheets on flame resistance.

In the laminate constitution, test piece No.5 corresponded to the test piece No.1, the test piece No.6 corresponded to the test piece No.2, and the test piece No.7 corresponded to the test piece No.3.

TABLE 4

| Sheet | | Flame retardancy |
| --- | --- | --- |
| CEx. 7 | test piece No. 5 | HB |
| CEx. 8 | test piece No. 6 | HB |
| Ex. 4 | test piece No. 7 | V-0 |

The results of the test pieces Nos. 5 and 6 (Comparative Example 7 and 8) show that it is difficult to improve the fiber-reinforced sheet in flame resistance by merely converting the constituting matrix resin to a flame-resistant resin. In Table 4, it is also clear that the flamability of the constituting matrix resin has an effect on the flame resistance of the sheet, and that the test piece 7 according to the present invention exhibited remarkably excellent flame resistance (V-0 grade).

EXAMPLE 5 AND COMPARATIVE EXAMPLE 9

The following two laminates were prepared from the same plain woven cloths of a carbon fiber (C), the same polycarbonate films (P) and the same meta-aramid fiber nonwoven fabrics (fiber structure material, M).
P/M/P/C/P/M/P (laminate 1)
P/C/P/M/P/C/P (laminate 2)

The above laminates were pressed in the same manner as in Example 3 to give a test piece No.8 from the laminate 1 and a test piece No.9 from the laminate 2. These test pieces Nos. 8 and 9 were subjected to a flame resistance test. Table 5 shows the results.

The content of one fiber structure material in the fiber-reinforced plastic sheet was about 10% by volume.

TABLE 5

| | Sheet | | Flame retardancy | Total $V_f$ |
| --- | --- | --- | --- | --- |
| CEx. 9 | test piece No. 8 | | HB | 30 |

TABLE 5-continued

| | Sheet | Flame retardancy | Total $V_f$ |
|---|---|---|---|
| Ex. 5 | test piece No. 9 | V-1 | 30 |

Table 5 clearly shows that the sheet structure in which the fiber structure material is placed between the reinforcing fiber materials is indispensable for the flame resistance effect of the fiber structure material.

EXAMPLE 6

This example describes the production of fiber-reinforced thermoplastic curved sheets. Laminates were prepared by stacking CF cloths, GF cloths and m-aramid NWF in the order of the following (i) to (v) stacking pattern with nylon 6 resin films (to be sometimes referred to as "N" hereinafter). Then, each laminate was heated and pressed at a temperature of 280° C. and at a pressure of 30 kg/cm² to give fiber-reinforced curved sheets containing a nylon 6 resin as a matrix resin.

(i) CF cloth/m-aramid NWF
(ii) CF cloth/m-aramid NWF (2 layers)
(iii) CF cloth/m-aramid NWF (3 layers)
(iv) CF cloth/m-aramid NWF/GF cloth
(v) GF cloth (2 layers)/m-aramid NWF (2 layers)

The following thicknesses and radius curvature sheets were molded by the above stacking reinforcements with a nylon 6 resin as a matrix resin.

| | |
|---|---|
| (i) | Sheet thickness 0.40 mm |
| | Radius curvature 150 mm |
| (ii) | Sheet thickness 0.50 mm |
| | Radius curvature 80 mm |
| (iii) | Sheet thickness 0.60 mm |
| | Radius curvature 50 mm |
| (iv) | Sheet thickness 0.55 mm |
| | Radius curvature 120 mm |
| (v) | Sheet thickness 0.67 mm |
| | Radius curvature 220 mm |

In addition, the "CF cloth" stands for a plain woven cloth of a carbon fiber (c/o6343, Weight 198 g/m²) supplied by Toray Industries, Inc., the "GF cloth" stands for a plain woven cloth of a glass fiber (MS-253E, Weight 250 g/m²) supplied by Asahi Fiber Glass Company Ltd., and the "m-aramid NWF" stands for a needle-punched nonwoven fabric of crimped short-cut fiber of poly-m-phenyleneisophthalaramide (Weight 60 g/m²), supplied by Teijin Limited.

EXAMPLE 7

This Example is describes the production of cylinders having a sandwich structure from the curved sheets produced according to the present invention.

Sandwich-structured cylinders having a length of 200 mm, an outer diameter of 200 mm and a thickness of 6 mm were produced from the curved sheets obtained in Example 6. In the production, an outer cylinder material from the sheet was attached on the internal surface of an outer cylindrical mold, an inner cylinder material from the sheet was attached on the external surface of an inner cylindrical mold, and the edges of each sheet were bonded together with a thermoplastic resin-containing adhesive. Then, the sheets and the molds as a whole were heated tip to 80° C., and a foaming polyurethane resin was injected into a gap between the sheet on the internal surface of the outer cylindrical mold and the sheet on the external surface of the inner cylindrical mold to foam it and fill the gap with it.

The sandwich-structured cylinder obtained from the sheet (iv) bad a foamed polyurethane density of 0.1.5 g/cm³, a cylinder density of 0.45 g/cm³ and a cylinder roundness of ±0.10 mm. The sandwich-structured cylinder obtained from the sheet (i) had a foamed polyurethane density of 0.15 g/cm³, a cylinder density of 0.50 g/cm³ and a cylinder roundness of ±0.15 mm.

EXAMPLE 8

This Example describes the production of a sandwich-structured cylinder having an excellent roundness from a carved sheet produced according to the present invention.

Sandwich-structured cylinders having a length of 400 mm, an outer diameter of 400 mm and a thickness of 7 mm were produced from the curved sheet (iv) obtained in Example 6 in the same manner as in Example 7.

In the above production, the injection state of the foaming polyurethane was changed. Then, the foamed polyurethane density and the roundness of each of the cylinders were measured. As a result, the cylinder obtained by the injection at room temperature had a foamed polyurethane density of 0.3 g/cm³ and a roundness of ±1.0 mm, whereas the cylinder obtained by the injection at 80° C. had a foamed polyurethane density of 0.1.5 g/cm³ and a greatly improved roundness of ±0.1 mm. Further, in the cylinder obtained by injecting the polyurethane at room temperature and heating it up to 80° C., the foamed polyurethane density remained unchanged or was 0.3 g/cm³, whereas it was found that its roundness was improved better than that of the cylinder obtained by the injection at room temperature, or it was ±0.3 mm.

EXAMPLE 9

This Example describes the production of a solid cylinder by a TEM method.

Five curved sheets taken from the curved sheet (iv) obtained in Example 6 were stacked and inserted between an outer cylindrical mold and an inner cylindrical mold. In this case, the inner cylindrical mold had been prepared by molding and cutting a heat-expandable thermoplastic resin so that it had an excellent roundness.

Then, the inner cylindrical mold was expanded by heating the mold to strongly press the laminate of the curved sheets to the internal surface of the outer cylindrical mold and thermally bond the curved sheets under the heat and pressure, whereby a solid cylinder having a length of 200 mm, an outer diameter of 200 mm and a thickness of 3 mm was obtained.

The above-obtained cylinder had a cylinder density of 0.75 g/cm³ and a roundness of ±0.15 mm.

COMPARATIVE EXAMPLE 10

Two carbon fiber (continuous fiber) plain woven cloths (c/o6343, Weight 198 g/m², supplied by Toray Industries, Inc.), one glass fiber continuous mat (M8625, Weight 300 g/m³, supplied by Asahi Fiber Glass Company Ltd) and six polycarbonate films (film formed from a polycarbonate resin "Panlite" (registered trade name) L-1250, supplied by Teijin Chemicals, Ltd.) were prepared.

These materials were stacked in the order of polycarbonate film (PC)/carbon fiber plain woven cloth (CF)/PC/PC/glass continuous mat (GF)/PC/PC/CF/PC.

The so-obtained laminate was hot-press molded in an open mold at 290 to 300 C. for 30 minutes to give a fiber-reinforced polycarbonate sheet having a thickness of 0.6 to 0.7 mm and $V_f$ of 50.

The above sheet showed many voids starting from the intersection portions of the carbon fiber cloth as centers on the surface. Further, the cross section of the sheet in the thickness direction was microscopically observed to show that there were contained many voids of which the sizes were tens to hundreds larger than the glass fiber diameter. It can be easily assumed that these voids work as a cause to greatly decrease mechanical properties, particularly dynamic mechanical properties, of the sheet.

EXAMPLE 10

The same two carbon fiber plain woven cloths as those used in Comparative Example 10, the same five polycarbonate films as those used in Comparative Example 10, and the same two span laces of a meta-aramid fiber as those used in Example 1 (prepared by carding meta-aramide crimped fiber, supplied by Teijin Limited, and subjecting it to water jet needling, fiber structure material having Weight of 70 g/m$^2$ and at least one fiber present in any imaginary square form having sides 10 times as large as the fiber diameter, and being substantially distributed) were stacked in the order of PC/CF/PC/meta-aramid fiber CM/PC/CM/PC/CF/PC, and the resultant laminate was molded under the same conditions as above to give a fiber-reinforced polycarbonate sheet.

The molded sheet surface showed no voids having a size exceeding the meta-aramid fiber diameter, nor did the microscopic observation of the cross section thereof in the thickness direction show such voids.

What is claimed is:

1. A fiber-reinforced thermoplastic sheet comprising at least one first layer formed by impregnating a woven or knitted fabric of continuous carbon fibers with a matrix resin of a thermoplastic resin and at least one second layer formed by impregnating a nonwoven fabric of a heat-resistant fiber with a matrix resin of a thermoplastic resin, the above first layer(s) and the second layer(s) being bonded by heat and pressure and being laminated integrally, the second layer having the heat-resistant fibers substantially uniformly distributed in the matrix resin in the cross section of the sheet and substantially having no voids of which the diameter exceeds the fiber diameter of the heat-resistant fibers, the nonwoven fabric used in the second layer having a fiber-entangling strength of at least 1.0 kg/mm$^2$ in any directions crossing at right angles.

2. The sheet of claim 1, wherein the nonwoven fabric of a heat-resistant fiber has a bulk density of at least 8.

3. The sheet of claim 1, wherein a polymer forming the heat-resistant fiber has a higher melting point than the thermoplastic resin as the matrix resin.

4. The sheet of claim 1, wherein the heat-resistant fiber is an organic heat-resistant fiber selected from the group consisting of a meta-type aramid fiber, a para-type aramid fiber, a polyaryrate fiber, a polyacrylonitrile fiber, a polybenzimidazole fiber, a polyethylene terephthalate fiber, a polyethylene naphthalate fiber and a cellulose fiber.

5. The sheet of claim 1, wherein the heat-resistant fiber is formed of a polymer which is meltable, has a limiting oxygen index (LOI) of at least 28%, and has no affinity to the thermoplastic resin as the matrix resin when it is in a molten state.

6. The sheet of claim 5, wherein the heat-resistant fiber is a meta-type aramid fiber.

7. The sheet of claim 1, wherein the second layer has at least one heat-resistant fiber in any imaginary square having sides ten times as large as a diameter of the heat-resistant fiber in a cross section of the sheet.

8. The sheet of claim 1, wherein the thermoplastic resin is selected from the group consisting of polyethylene, polypropylene, polyvinyl chloride, polystyrene, polycarbonate, polyethylene terephthalate, polybutylene terephthalate, nylon 6, nylon 66, polyphenylene sulfide, ABS and a copolymer formed of structural units of at least two of these polymers.

9. The sheet of claim 1, wherein at least two first layers are present and at least one second layer is present between the first layers.

10. The sheet of claim 1, wherein the continuous carbon fiber woven or knitted fabric and the nonwoven fabric of the heat-resistance fiber in total comprise 30 to 70% by volume of the sheet.

11. A flame-resistant, fiber-reinforced thermoplastic sheet comprising at least one first layer formed by impregnating a woven or knitted fabric of heat-resistant reinforced fibers with a matrix resin of a thermoplastic resin and at least one second layer formed by impregnating a nonwoven fabric of a heat-resistant fiber with a matrix resin of a thermoplastic resin, the above first layer(s) and the second layer(s) being bonded by heat and pressure and being laminated integrally, the second layer having the heat-resistant fibers substantially uniformly distributed in the matrix resin in the cross section of the sheet and substantially having no voids of which the diameter exceeds the fiber diameter of the heat-resistant fibers, the nonwoven fabric used in the second layer having a fiber-entangling strength of at least 1.0 kg/mm$^2$ in any directions crossing at right angles, the heat-resistant fiber of the nonwoven fabric being formed of a polymer which is meltable, has a limiting oxygen index (LOI) of at least 28%, and exhibits no affinity to the thermoplastic resin of the matrix resin while it is in a molten state.

12. The sheet of claim 11, wherein the heat-resistant fiber is a meta aramid fiber.

13. The sheet of claim 11, wherein the matrix resin contains a flame retardant.

14. The sheet of claim 11, wherein the fiber structure material of the second layer makes up 10 to 20% by volume of the sheet.

15. A fiber-reinforced thermoplastic sheet comprising at least two first layers formed by impregnating a woven or knitted fabric of continuous carbon fibers with a matrix resin of a thermoplastic resin, wherein the thermoplastic resin is selected from the group consisting of polyethylene, polypropylene, polyvinyl chloride, polystyrene, polycarbonate, polyethylene terephthalate, polybutylene terephthalate, nylon 6, nylon 66, polyphenylene sulfide, ABS and a copolymer formed of structural units of at least two of these polymers, and at least one second layer between the two first layers and formed by impregnating a nonwoven fabric of a heat-resistant fiber with a matrix resin of a thermoplastic resin, wherein the heat-resistant fiber is an organic heat-resistant fiber selected from the group consisting of a meta aramid fiber, a para aramid fiber, a polyaryate fiber, a polyacrylonitrile fiber, a polybenzimidazole fiber, a polyethylene terephthalate fiber, a polyethylene terephthalate fiber, a polyethylene naphthalate fiber and a cellulose fiber, and has a higher melting point than the thermoplastic resin forming the matrix resin, and the above first layers and the second layer(s) being bonded by heat and pressure and being laminated integrally, the second layer having the heat-resistant fibers substantially uniformly distributed in the matrix resin in the cross section of the sheet and substantially having no voids of which the diameter exceeds the fiber diameter of the heat-resistant fibers, the nonwoven fabric used in the second layer having a fiber-entangling strength of at least 1.0 kg/mm² in any directions crossing at right angles.

16. The method of claim 15, wherein the heat-resistant fiber is formed of a polymer which is meltable, has a limiting oxygen index (LOI) of at least 28%, and has no affinity to the thermoplastic resin as the matrix resin when it is in a molten state.

17. The method of claim 15, wherein the heat-resistant fiber is a meta aramid fiber.

18. The sheet of claim 15, wherein the second layer has at least one heat-resistant fiber in any imaginary square having sides ten times as large as a diameter of the heat-resistant fiber in a cross section of the sheet.

19. A flame-resistant, fiber-reinforced thermoplastic sheet comprising at least two first layers formed by impregnating a woven or knitted fabric of heat-resistant reinforced continuous carbon fibers with a matrix resin of a thermoplastic resin and at least one second layer between the two first layers and formed by impregnating a nonwoven fabric of a heat-resistant fiber with a matrix resin of a thermoplastic resin, wherein the heat-resistant fiber is a meta aramid fiber and has a higher melting point than the thermoplastic resin forming the matrix, the above first layers and the second layer(s) being bonded by heat and pressure and being laminated integrally, the second layer having the heat-resistant fibers substantially uniformly distributed in the matrix resin in the cross section of the sheet and substantially having no voids of which the diameter exceeds the fiber diameter of the heat-resistant fibers, the nonwoven fabric used in the second layer having a fiber-entangling strength of at least 1.0 kg/mm² in any directions crossing at right angles, the heat-resistant fiber of the nonwoven fabric being formed of a polymer which is meltable, has a limiting oxygen index (LOI) of at least 28%, and exhibits no affinity to the thermoplastic resin of the matrix resin while it is in a molten state.

20. The sheet of claim 19, wherein the heat-resistant fiber is formed of a polymer which is meltable, has a limiting oxygen index (LOI) of at least 28%, and has no affinity to the thermoplastic resin as the matrix resin when it is in a molten state.

21. The sheet of claim 19, wherein the second layer has at least one heat-resistant fiber in any imaginary square having sides ten times as large as a diameter of the heat-resistant fiber in a cross section of the sheet.

22. The sheet of claim 19, wherein the matrix resin contains a flame retardant.

* * * * *